(12) United States Patent
Devereaux

(10) Patent No.: US 12,477,254 B2
(45) Date of Patent: Nov. 18, 2025

(54) DYNAMIC SENSOR DATA PROCESSING FOR UTILITY SYSTEM

(71) Applicant: Aclara Technologies LLC, St. Louis, MO (US)

(72) Inventor: Peggy Rose Devereaux, Saint Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 18/596,442

(22) Filed: Mar. 5, 2024

(65) Prior Publication Data

US 2024/0305912 A1 Sep. 12, 2024

Related U.S. Application Data

(60) Provisional application No. 63/450,263, filed on Mar. 6, 2023.

(51) Int. Cl.
*H04Q 9/00* (2006.01)

(52) U.S. Cl.
CPC ..................................... *H04Q 9/00* (2013.01)

(58) Field of Classification Search
CPC ............................ H04Q 9/00; H04Q 2209/823
See application file for complete search history.

(56) References Cited

U.S. PATENT DOCUMENTS

| | | | |
|---|---|---|---|
| 2012/0029314 A1* | 2/2012 | Paquet | A61B 5/0002 600/301 |
| 2017/0254712 A1* | 9/2017 | Devereaux | F17D 3/01 |
| 2019/0125902 A1* | 5/2019 | Rajagopalan | C09B 57/00 |
| 2022/0095084 A1* | 3/2022 | Evans | H05B 47/19 |
| 2022/0417936 A1* | 12/2022 | Yu | H04W 28/0236 |
| 2023/0090027 A1 | 3/2023 | Devereaux et al. | |

FOREIGN PATENT DOCUMENTS

CN 208653530 U 3/2019

OTHER PUBLICATIONS

PCT/US2024/018569 International Search Report and Written Opinion dated Jun. 3, 2024 (29 pages).

* cited by examiner

*Primary Examiner* — Amine Benlagsir
(74) *Attorney, Agent, or Firm* — Michael Best & Friedrich LLP

(57) ABSTRACT

A telemetry device is configured to receive data from one or more sensing devices associated with a component of a utility system. The telemetry device processes the received data by determining a range associated with a value of the received data, and in response to determining the value of the received data is in a first range, generate a first data package having a second number of received data values and transmit the first data package at a first transmission interval. In response to determining that the value of the received data is in a second range, the telemetry device is configured to generate a second data package having a second number of received data values and transmit the second data package at a second transmission interval.

18 Claims, 6 Drawing Sheets

DYNAMIC SENSOR DATA PROCESSING FOR UTILITY SYSTEM

CROSS-REFERENCE TO RELATED APPLICATIONS

This application claims priority to, and the benefit of, U.S. Provisional Patent Application No. 63/450,263, filed Mar. 6, 2023, the entire contents of which are incorporated by reference herein.

BACKGROUND

Utility systems, such as distribution systems or transport systems, generally include various sensor devices that are used to sense various parameters of the utility system. Often the sensors, as well as associated telemetry devices configured to receive the data, are powered via a battery or other energy storage device. Due to the reliance on energy storage devices for power, data transmissions between the sensor devices and telemetry devices are minimized to extend the operational life of the energy storage device. This can result in data being incomplete, or not timely provided where needed. In some instances, in the event of an alarm condition being detected, real time data may be requested by the telemetry unit and transmitted accordingly. However, this results in only real time data being provided only after an alarm has occurred, thereby reducing opportunities to address a condition before it progresses to a condition warranting an alarm. Additionally, due to the potential for a large number of devices within the utility system, the amount of traffic on a data network can be cumbersome to the infrastructure. Thus, where sensed parameters are below an alarm level, there is no need to provide real time or near real time data to the utility controller. Accordingly, a system that varies the transmission of sensor data based on various sensed data levels would be advantageous to allow for maintenance or other corrective actions to be taken prior to an alarm condition being generated, while still optimizing the battery life of the various sensor devices and/or telemetry units within the system, as well as network utilization.

SUMMARY

The devices, systems and methods described herein allow for a data collection device, such as a telemetry device, of a utility system to dynamically adjust the contents of a data package, as well as a transmission interval of the data package based on the received data from a sensor falling within one or more predetermined ranges.

In one embodiment, a telemetry device associated with a utility system is described. The telemetry device includes a communication module and one or more electronic processors in communication with the communication module. The one or more electronic processors are configured to receive data from one or more sensor devices, wherein the sensor devices are configured to sense one or more parameters of a component of the utility system. The electronic processors are further configured to determine a range associated with a value of the received data, and in response to determining that the value of the received data is in a first range, generate a first data package having a first number of received data values and transmit the first data package at a first transmission interval. In response to determining that the value of the received data is in a second range, the electronic processors are further configured to generate a second data package having a second number of received data values and transmit the second data package at a second transmission interval. The second number of received data values is larger than the first number of received data values, the second transmission interval is a shorter interval than the first transmission interval.

In another embodiment, a method for processing data by a telemetry device having one or more electronic processors for executing the method is described, according to some embodiments. The method includes receiving data from one or more sensor devices that are configured to sense one or more parameters of a component of a utility system, and determining a range associated with a value of the received data. The method further includes generating a data package based on the determined range and transmitting the data package at an interval based on the determined range.

In another embodiment, a telemetry device associated with a utility system is described. The telemetry device includes a communication module and one or more electronic processors in communication with the communication module. The one or more electronic processors are configured to receive data from one or more sensor devices, wherein the sensor devices are configured to sense one or more parameters of a component of the utility system. The electronic processors are further configured to determine a range associated with a value of the received data, and in response to determining that the value of the received data is in a first range, generate a first data package having a first number of received data values and transmit the first data package at a first transmission interval. In response to determining that the value of the received data is in a second range, the electronic processors are further configured to transmit a polling command to the one or more sensor devices at a first polling interval, receive updated data from the one or more sensor devices in response to the transmitted polling command, generate a second data package having a second number of received data values, and transmit the second data package at a second transmission interval. The second number of received data values is larger than the first number of received data values, and the second transmission interval is shorter than the first transmission interval.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
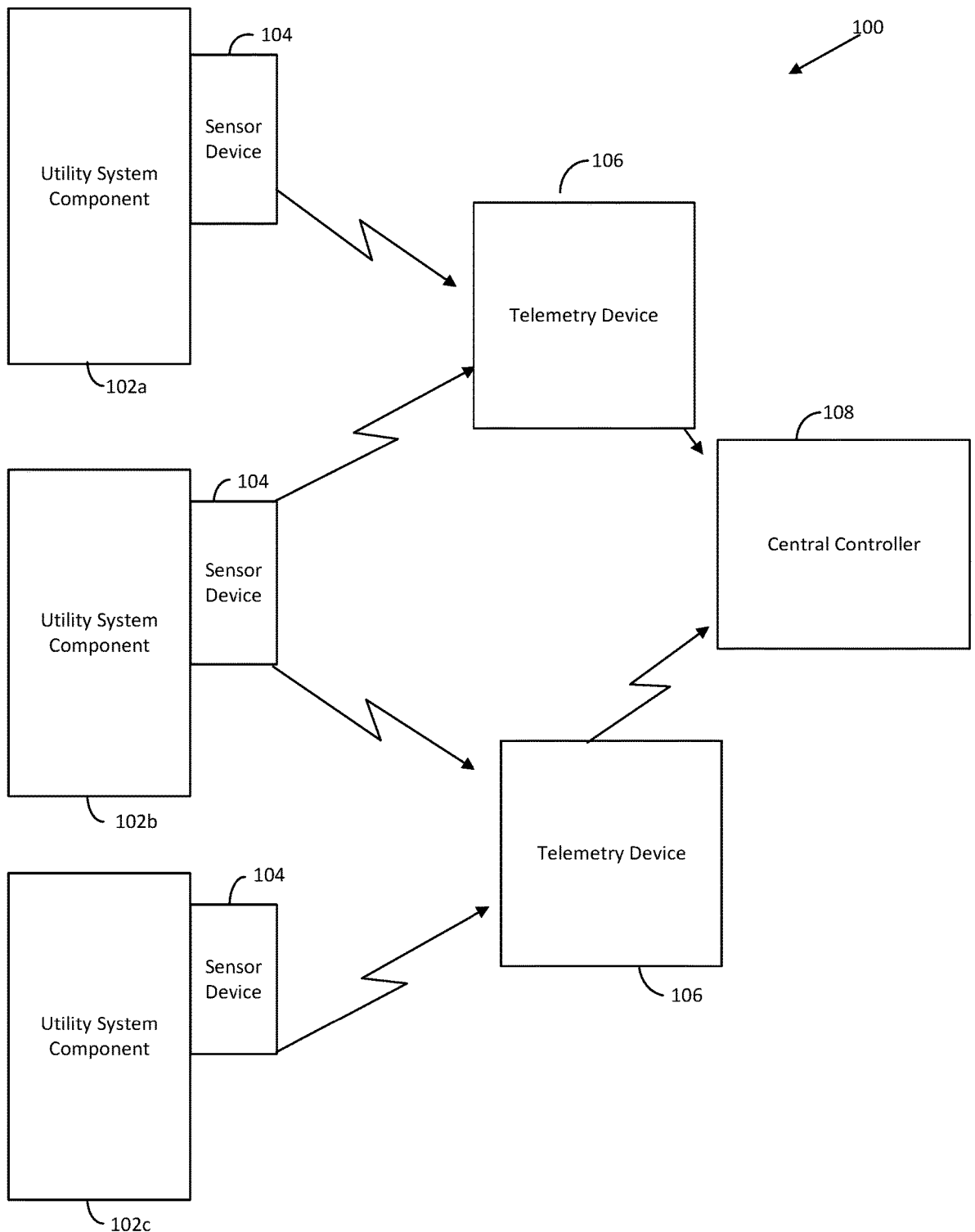
FIG. 1 is a block diagram illustrating a utility system, according to some embodiments.

FIG. 1 illustrates an example utility distribution and/or transport system 100, according to some embodiments. For brevity, the utility distribution and/or transport system 100 will be referred to as a "utility system" for purposes of this application. The utility system 100 includes a number of utility components 102a-c. The utility components 102a-c may be various components associated with a utility system. For example, the utility components 102a-c may include pipelines (e.g., gas, water, sewage, etc.), electrical lines, transformers, lift stations, water treatment facilities, electrical substations, power plants, solar panels, windmills, and/or any other component associated with a utility system Furthermore, while the system 100 shows only three utility components 102a-c, it is understood that the system 100 may include more than three utility components 102a-c or less than three utility components 102a-c.

Each utility component 102a-c may have one or more sensor devices 104 associated therewith. The sensor devices 104 may be configured to sense one or more parameters associated with the specific utility component 102a-c. In some embodiments, the sensor devices 104 are coupled to an existing utility component 102a-c. In other embodiments, the sensor devices 104 are integrated into the utility components 102a-c during installation or manufacturing. In some embodiments, the sensor devices 104 may include one or more sensors for detecting one or more parameters, such as those described above. For example, the sensor devices 104 may be configured to sense parameters such as methane gas saturation, fluid pressure, fluid level (or presence), gas detection, gas concentration, pressure, voltage, current, temperature, light level, corrosion, chemical presence, flow, overflow, flood, tilt, vibration, acceleration, velocity, volume, pH, conductivity, oxidation, chlorine, chlorophyll, algae, humidity, resistance, inductance, sound levels, proximity, motion, air quality, total dissolved solids ("TDS"), chemical concentration, or other parameter associated with a utility system as required for a given application.

In some embodiments, the sensor devices 104 may communicate with one or more sensors or other devices. For example, the sensor devices 104 of the utility system 100 may be configured to communicate with one or more telemetry units (devices) 106. In some examples, the sensor devices 104 may be configured to receive power via the utility components 102a-c, such as via a hardwired connection. However, in other examples, the sensor devices 104 may include a power source, such as a battery or other energy storage device (e.g., super capacitor). In still further examples, the sensor devices 104 may be configured to both receive power from an associated utility component 102a-c and/or an internal or external power source, depending on a given application.

As mentioned above, the utility system 100 further includes one or more telemetry units 106. The telemetry units 106 are configured to receive data from one or more sensor devices 104, process the received data, and transmit the processed data to one or more other devices, such as a central utility controller 108. As will be described in more detail, the telemetry units 106 may package data received from the one or more sensor devices 104 based on a value of the received data. For example, where the data is below a threshold (e.g., "normal"), the telemetry units 106 may only transmit data once a day. However, where the data is above a threshold, or within a predefined range, the telemetry units 106 may vary the rates and types of data they transmit.

In some examples, the telemetry units 106 are configured to communicate with the one or more sensor devices 104 using one or more wireless communication protocols, such as, Bluetooth, Bluetooth Low Energy ("BLE"), Cellular (e.g. 3G, 4G, 5G, LTE, CDMA, TDMA, etc.), RF, Wi-Fi, LoRa, LoRaWAN, Z-wave, Thread, Zigbee, Matter, and/or any other applicable wireless communication protocol as described in more detail below. In some examples, the telemetry units 106 may communicate using a proprietary communication protocol. The telemetry units 106, are also configured to communicate with other devices, such as the central utility controller 108. The telemetry units 106 may communicate with the central utility controller 108 using the same or different wireless communication protocol used to communicate with the sensor devices 104. For example, the telemetry units 106 may communicate with the central utility controller using wireless communication protocols such as Bluetooth, Bluetooth Low Energy ("BLE"), Cellular (e.g., 3G, 4G, 5G, LTE, CDMA, TDMA, etc.), RF, Wi-Fi, LoRa, LoRaWAN, Z-wave, Thread, Zigbee, Matter, and/or any other applicable wireless communication protocol. While only two telemetry units 106, are shown in the system 100, it is contemplated that the system may include multiple telemetry units 106 or fewer telemetry units 106.

As described above, the telemetry units may further be configured to communicate with a central utility controller 108. The central utility controller 108 may be a dedicated server system, a cloud-based controller, etc. In one embodiment, the central utility controller 108 may communicate with one or more cloud-based platforms or internet observers. The central utility controller 108 may be configured to control and monitor various portion, or all, of the utility system 100.

Figure 2:
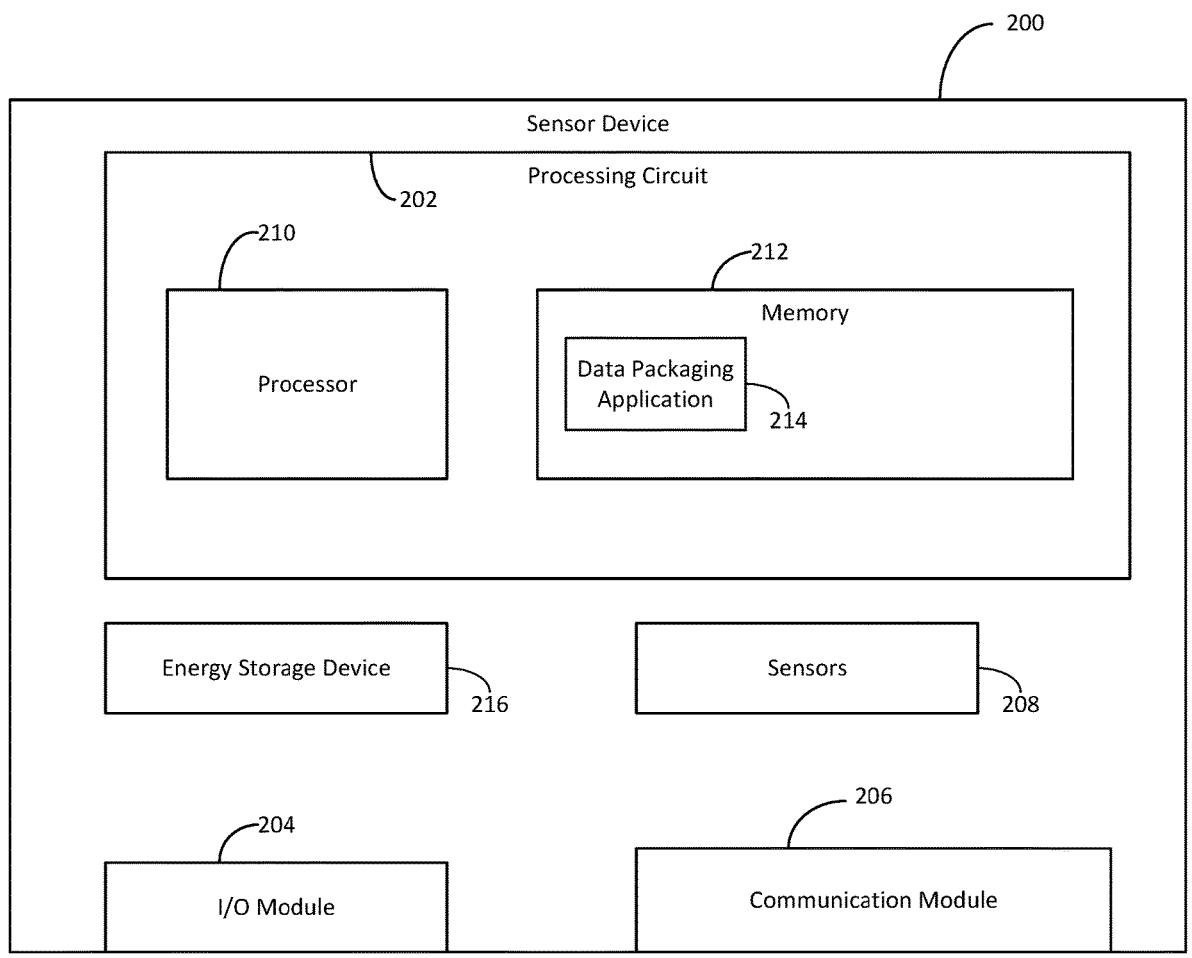
FIG. 2 is a block diagram illustrating a utility sensing device according to some embodiments.

Turning now to FIG. 2, a block diagram illustrating a sensor device 200 is shown, according to some embodiments. The sensor device 200 may be similar to the sensor devices 104, described above. Similar to above, the sensor device 200 is configured to interface with one or more utility components, such as the utility components 102a-c described above, to monitor one or more parameters associated with the utility component and communicate the data to one or more other devices, such as a telemetry unit 106, as described above.

As shown in FIG. 2, the sensor device 200 includes a processing circuit 202, an input/output ("I/O") module 204, a communication module 206, and one or more sensors 208. The processing circuit 202 may include an electronic processor 210 and a memory 212. The processing circuit 202 may be communicably connected to one or more of the I/O modules 204, the communication module 206 and/or the sensors 208. The electronic processor 210 may be implemented as a programmable microprocessor, an application specific integrated circuit (ASIC), one or more field programmable gate arrays (FPGA), a group of processing components, or other suitable electronic processing components.

The memory 212 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 212 may include database components, object code components, script components, or other types of code and information for supporting the various activities and information structure described in the present application. According to one example, the memory 212 is communicably connected to the electronic processor 210 via the processing circuit 202 and may include computer code for executing (for example, by the processing circuit 202 and/or the electronic processor 210) one or more processes described herein.

In one embodiment, the memory 212 may include one or more applications, programs, etc., such as a data packaging application 214. The data packaging application 214 may be configured to perform one or more functions or operations, such as collecting, packaging, and transmitting data associated with a utility component coupled to the sensor device 200, as will be described in more detail below.

The I/O module 204 may be configured to interface directly with one or more devices, such as a utility component 102a-c, as described above. In one embodiment, the I/O module 204 may utilize general purpose I/O (GPIO) ports, analog inputs, digital inputs, etc. to interface with the one or more devices. In one embodiment, the I/O module 204 may be configured to interface with a utility component, such as utility components 102a-c, such that various parameters associated with the utility component can be provided to the sensor device 200. For example, a utility component may have one or more internal sensors, such as temperature sensors, current sensors, voltage sensors, etc., which can be communicated to the sensor device 200 via the I/O module 204. Other data, such as operating time, determined faults, location information, etc. may also be provided to the sensor device 200 via the I/O module 204. In still further examples, the sensor device 200 may receive power from the utility components directly via the I/O module 204. In other embodiments, the I/O module 204 may be coupled to one or more energy harvesting devices, such as current transformers ("CT"), which can provide energy to the sensor device 200. In one embodiment, the energy received via the I/O module 204 may be stored in an energy storage device 216, such as a battery (e.g., lithium-ion, lithium iron phosphate, etc.), super-capacitor, etc.

The communication module 206 may be configured to provide communications between the sensor device 200 and one or more external devices, such as a telemetry unit 106, described above. The communication module 206 may use one or more wireless communication protocols to provide communication to/from the external devices. In one embodiment, the local communication module uses Wi-Fi to provide communication to/from the external devices. However, other wireless communication protocols, such as Bluetooth, Cellular (e.g., 3G, 4G, 5G, LTE, CDMA, TDMA, etc.), RF, Wi-Fi, LoRa, LoRaWAN, Z-wave, Thread, Matter, and/or any other applicable wireless communication protocol. As noted above, in some examples, the communication module 206 may use a proprietary communication protocol to facilitate communication to/from one or more external devices.

The sensor device 200 may include one or more sensors 208 configured to monitor one or more aspects of an associated utility component. Sensors may include voltage sensors, current sensors, power sensors, motion sensors (e.g. inclinometers, accelerometers, etc.), light sensors (e.g. photovoltaic sensors), sound sensors, level sensors, flow sensors, pressure sensors, temperature sensors, moisture sensors, gas and chemical sensors, biological sensors, leak sensors, metal sensors, motion sensors, force sensors, flaw sensors, contact and non-contact sensors, and/or other sensors as required for a given application. The sensors 208 may be configured to detect various parameters of the utility system, including parameters such as methane gas saturation, fluid pressure, fluid level (or presence), gas detection, gas concentration, pressure, voltage, current, temperature, light level, corrosion, chemical presence, flow, overflow, flood, tilt, vibration, acceleration, velocity, volume, pH, conductivity, oxidation, chlorine, chlorophyll, algae, humidity, resistance, inductance, sound levels, proximity, motion, air quality, total dissolved solids ("TDS"), chemical concentration, or other parameter associated with a utility system as required for a given application. The above sensor types and associated parameters are for exemplary purposes, and it is contemplated that additional sensor types may be used, as required for a given application.

Figure 3:
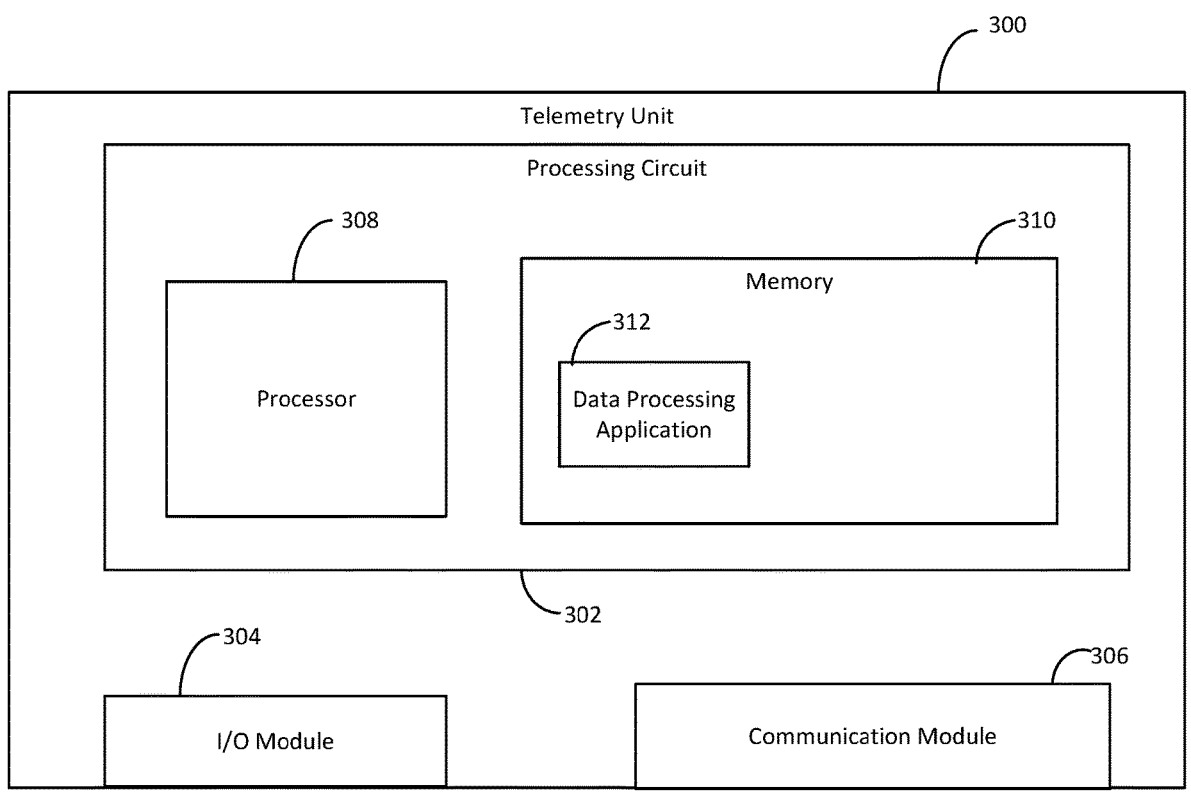
FIG. 3 is a block diagram illustrating a telemetry unit of the utility system, according to some embodiments.

Turning now to FIG. 3, a block diagram of a telemetry unit 300 is shown, according to some embodiments. The telemetry unit 300 may be similar to the telemetry units 106 of FIG. 1 and can be used interchangeably herein. The telemetry unit 300 includes a processing circuit 302, an I/O module 304, and a communication module 306. The processing circuit 302 may include an electronic processor 308 and a memory 310. The processing circuit 202 may be communicably connected to one or more of the user interface modules 304 and the communication module 306. The electronic processor 308 may be implemented as a programmable microprocessor, an application specific integrated circuit (ASIC), one or more field programmable gate arrays (FPGA), a group of processing components, or other suitable electronic processing components.

The memory 310 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 310 may include database components, object code components, script components, or other types of code and information for supporting the various activities and information structure described in the present application. According to one example, the memory 310 is communicably connected to the electronic processor 308 via the processing circuit 302 and may include computer code for executing (for example, by the processing circuit 302 and/or the electronic processor 308) one or more processes described herein.

In one embodiment, the memory 310 may include one or more applications, programs, etc., such as a data processing application 312. The data processing application 312 may be configured to process data received from one or more sensor devices, such as sensor device 200 described above. As will be described in more detail, the data processing application may package and transmit the data received from the sensor devices 200 to various other devices, such as a central utility controller 108. The data processing application 312 may package and/or transmit the data based on one or more sensed values within the received data. For example, where a sensed value falls into a range, the data processing application 312 may increase the amount or type of data transmitted, as well as increase the rate at which the data is transmitted, as will be described in more detail below.

The I/O module 304 may be configured to interface directly with one or more devices, such as a sensor device 200, as described above. In one embodiment, the I/O module 304 may utilize general purpose I/O (GPIO) ports, analog inputs, digital inputs, etc. to interface with the one or more devices. In still further examples, the telemetry unit 300 may receive power from an external power source directly via the I/O module 204. In other embodiments, the I/O module 204 may be coupled to one or more energy harvesting devices, such as current transformers ("CT"), which can provide energy to the telemetry unit 300. In one embodiment, the energy received via the I/O module 304 may be stored in an energy storage device, such as a battery (e.g., lithium-ion, lithium iron phosphate, etc.), super-capacitor, etc.

The communication module 306 may be configured to provide communications between the telemetry unit 300 and one or more external devices, such as one or more sensor devices 104 and/or a central controller, such as central utility controller 108, described above. The communication module 306 may use one or more wireless communication protocols to provide communication to/from the external devices. In one embodiment, the communication module uses Wi-Fi to provide communication to/from the sensor devices 200. However, other wireless communication protocols, such as Bluetooth, Cellular (e.g., 3G, 4G, 5G, LTE, CDMA, TDMA, etc.), RF, Wi-Fi, LoRa, LoRaWAN, Z-wave, Thread, and/or any other applicable wireless communication protocol. As noted above, in some examples, the communication module 306 may use a proprietary communication protocol to facilitate communication to/from one or more external device. In one embodiment, the communication module 306 is coupled to an antenna (not shown) for communicating to/from the telemetry unit 300. In some examples, the communication module 306 may be configured to use multiple communication protocols. For example, the communication module 306 may communicate with one or more sensor devices 200 using a first communication protocol (e.g., Bluetooth, Wi-Fi, etc.) and then communicate with other devices, such as the central utility controller 108, using a second communication protocol (e.g., cellular, Wi-Fi, etc.).

Figure 4:
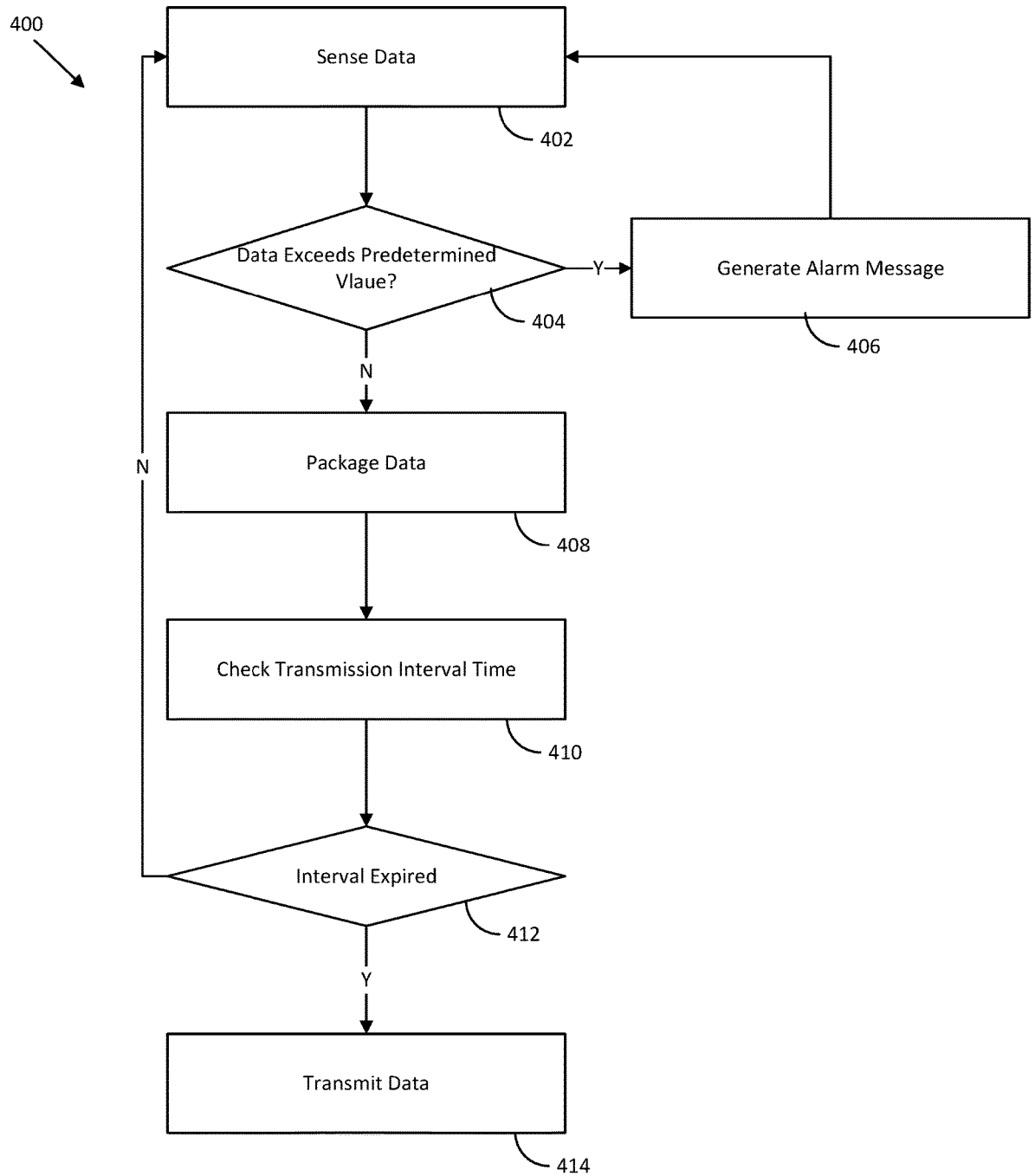
FIG. 4 is a flowchart illustrating a process for sensing data using the sensing device of FIG. 2, according to some embodiments.

Turning now to FIG. 4, a flow chart illustrating a process 400 for collecting and transmitting data from a sensor device, such as sensor device 200 described above, is shown, according to some embodiments. While described with respect to sensor device 200, it is understood that the sensor devices 104a-c may be used interchangeably herein. In one embodiment, the data packaging application 214 described above, is responsible for controlling the sensor device 200 to perform the process 400. At process block 402, the sensor device 200 senses one or more parameters of an associated utility component, as described above. For example, the sensors 208 may sense one or more parameters of an associated utility component. As described above, sensed parameters may include various parameters, such as voltage, current, force, pressure, flow, etc. In some examples, the sensed parameters may include external factors related to the utility component, such as temperature, moisture, gas presence, visual data, audio data, etc. As described above, the sensors 208 may be configured to sense any parameter associated with a utility system. In some embodiments, the sensors 208 may sense values at intervals, such as every minute. However, values of less than one minute or more than one minute are also contemplated. In other examples, the sensors 208 may sense data in real time.

Upon sensing the data, the sensor device 200 determines whether any of the sensed data values exceed a pre-determined value at process block 404. The pre-determined value may be associated with an alarm condition. The pre-determined values may be programmed into the sensors at various times, such as during manufacturing. In other embodiments, the pre-determined values may be provided by a user to the sensor device 200, such as via the I/O module 204. In response to determining that the sensed data exceeds a pre-determined value, an alarm message is generated and transmitted at process block 406. In some examples, the alarm message is transmitted by the communication module 306 to one or more devices, such as a telemetry unit 300. The alarm message may include an indication of the alarm, e.g., an alarm bit, and the data associated with the alarm. The sensor device 200 then continues sensing data at process block 402.

In response to determining that none of the sensed data values exceed the predetermined threshold, the sensor device 200 packages the data at process block 408. In one embodiment, the data packaging application 214 packages the data. In one embodiment, packaging the data may include converting the data into a transmittable data packet. For example, the sensed data may be integrated into a Wi-Fi SSID packet. In other examples, the sensed data may be integrated into a Bluetooth message packet. Generally, the data is packaged for transmission over a communication protocol for communication to one or more data collection devices, such as telemetry unit 300, described above. In some embodiments, the data may be packaged containing the most recently sensed data. In some examples, the data may be packaged with multiple values over a predefined period of time, such as one minute. However, values of more than one minute or less than one minute are also contemplated. In some embodiments, the sensors 208 may only update values once every minute, but the data packaging application 214 may read data at a faster rate, such as every 5 seconds. Thus, for each minute of data packaged, there would only be a single reading change. Other data packaging schemes may also be used as required for a given application.

Upon packaging the data, the sensor device 200 checks a transmission interval time at process block 410. The transmission interval time may be a set interval between transmissions by the sensor device. In some embodiments, the transmission interval time may be one minute. However, transmission interval times of more than one minute, or less than one minute are also contemplated as required for a given application. In some examples, the transmission interval time may be dynamically determined based on a status of the energy storage device 216. For example, where a state-of-charge (SoC) of the energy storage device falls below a predetermined level, such as 50%, the transmission interval time may increase to reduce energy consumption due to transmitting the packaged data. The above values are for exemplary purposes only, and various other energy storage devices parameters and/or threshold may be used to modify the transmission interval time as required for a given application.

At process block 412, the sensor device 200 determines whether the transmission interval time has expired. In response to determining that the transmission time has not expired, the sensor device 200 continues to check the interval time at process block 410. In response to determining that the transmission interval time has expired, the sensor device 200 transmits the packaged data at process block 414.

Figure 5:
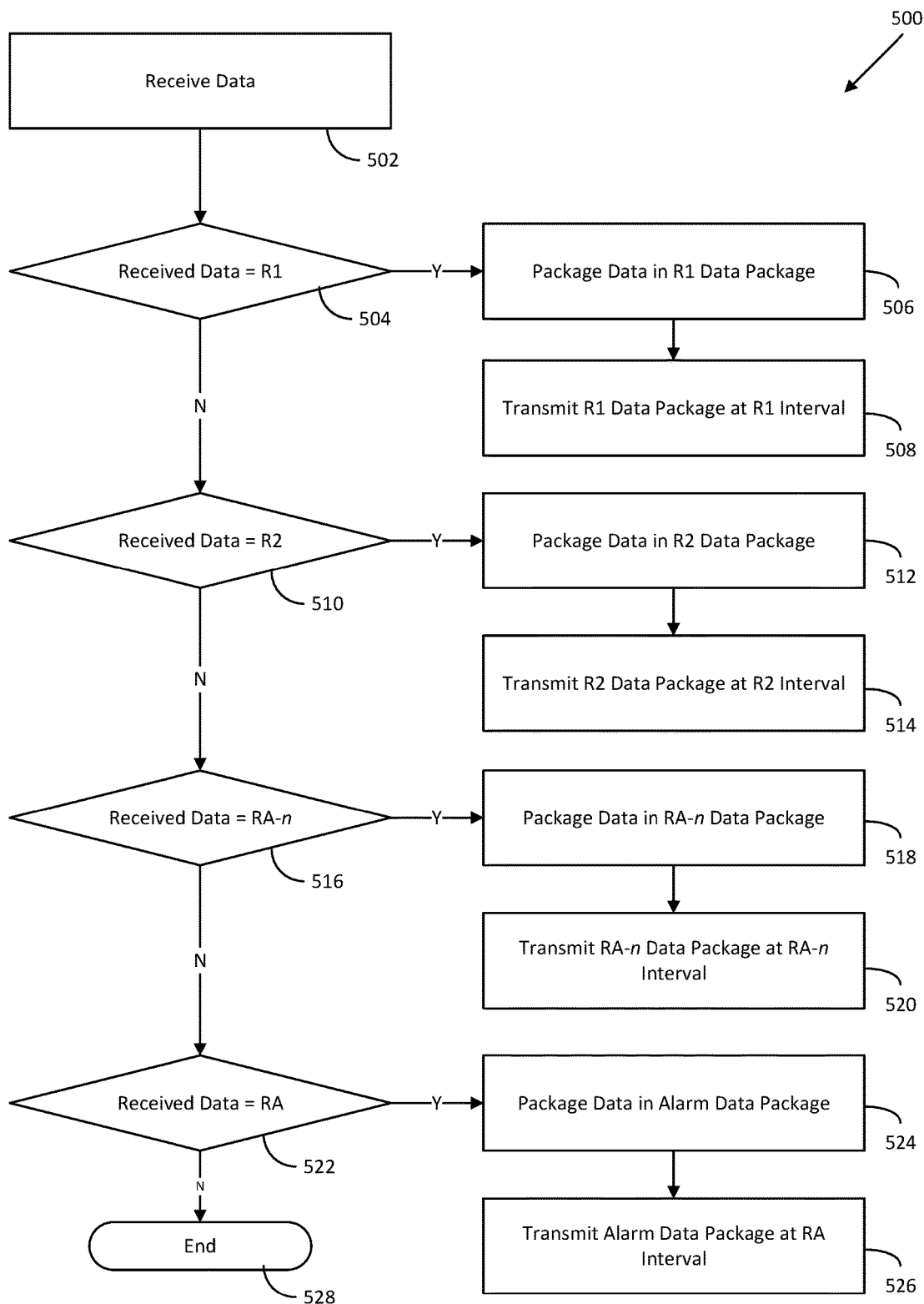
FIG. 5 is a flowchart illustrating a process for processing data at the telemetry unit of FIG. 3 according to some embodiments.

Turning now to FIG. 5, a process 500 for processing data at a telemetry unit, such as telemetry unit 300 is described according to some embodiments. While described with respect to telemetry unit 300, it is understood that the process 500 may be executed by the telemetry unit 106 described above, which may be used interchangeably. In one example, the processor 308 is configured to perform the process 500 by executing an application, such as the data processing application 312.

At process block 502, the telemetry unit 300 receives sensor data from one or more devices, such as sensor devices 200. In some embodiments, the sensor data may be received via the communication module 306. However, in other examples, the sensor data may also be received via the I/O module 304. At process block 504, the telemetry unit 300 determines whether the received sensor data falls within a first range ("R1"). The first range may include a range of values considered normal or nominal for a sensed parameter of a given utility system component.

In response to determining that the received sensor data does fall within the first range, the received data is packaged in an R1 data packet at process block 506. The R1 data packet may include sensed data values over a first period of time, such as one sensed value for every 24 hours. However, periods of time of more than 24 hours or less than 24 hours are also contemplated as required for a given application. This allows for network traffic to be reduced by limiting the amount of data in a data packet. As the first range is associated with normal sensed data values, there is no need to provide large amounts and/or granular readings to a receiving device, such as the central utility controller 108. In some embodiments, the data for the previous 24 hours may also be included in the R1 data packet for error checking and data redundancy. For example, in the event that the central utility controller 108 did not receive the data packet including data for the previous 24 hours, the R1 data packet will include that data as well to increase the likelihood that the data will be received by the central utility controller 108. In other embodiments, the R1 data packet may include additional data points, such as every 12 hours, six hours, etc. In some embodiments, the R1 data packet may include an average of values received over the first period of time. The R1 data packet may further include additional information, such as the number of data reads (e.g., different sensed data values) within the message, the transmission interval, etc.

Once the received sensor data is packaged, the R1 data packet is transmitted at an R1 interval at process block 508. In one embodiment, the R1 interval is 24 hours. However, values of more than 24 hours or less than 24 hours are also contemplated as required for a given application. The R1 interval is configured to reduce energy usage of the telemetry unit 300, as well as to reduce traffic and data on a given communication network. This is especially beneficial in large utility systems with a large number of sensors. The R1 data packet may be transmitted via the communication module 306, as described above.

In response to determining that the data is not within the first range, the telemetry unit 300 determines whether the data is in a second range ("R2") at process block 510. The second range may include a range of values slightly above the normal or nominal values, but still within a non-alarm generating range. For example, where the sensed data is a methane concentration level, there may be an alarm level, such as a 10% concentration. However, values below 10%, while still within a nominal range, may be indicative of a potential issue based on the value. For example, the second range may be approximately 20-40% of the alarm value. However, values of more than 40% or less than 20% are also contemplated as required for a given application.

In response to determining that the received sensor data does fall within the second range, the received data is packaged into a R2 data packet at process block 512. The R2 data packet may include sensed data values over a second period of time, such as one sensed value for every 12 hours. However, periods of time of more than 12 hours or less than 12 hours are also contemplated as required for a given application. In one embodiment, the second period of time is less than the first period of time. As the second range is still associated with sensed data values below an alarm level, there is no need to send real-time or near real time data to the central utility controller 108. However, as the sensed data values have increased, there is a benefit to providing more data to the central utility controller 108 at a more frequent interval. Further, the R2 packet may include data for every hour within the 12-hour interval, as received form the sensor device 200. Thus, twelve separate data reads may be provided to the central utility controller 108 within the R2 packet. The above R2 packet data is for exemplary purposes only, and it is understood that more or less data may be provided within the R2 packet as required for a given application. However, generally the amount of data included in the R2 packet is greater than the amount of data in the R1 packet.

In some embodiments, the data for the previous 12-hour period may also be included in the R2 data packet for error checking and data redundancy. For example, in the event that the central utility controller 108 did not received the data packet including data for the previous 12 hours, the R2 data packet will include that data as well to increase the likelihood that the data will be received by the central utility controller 108. The R2 data packet may further include additional information, such as the number of data reads (e.g., different sensed data values) within the message, the transmission interval, etc.

Once the received sensor data is packaged, the R2 data packet is transmitted at a R2 interval at process block 514. In one embodiment, the R2 interval is 12 hours. However, values of more than 12 hours or less than 12 hours are also contemplated as required for a given application. The R2 interval is configured to reduce energy usage of the telemetry unit 300, as well as to reduce traffic and data on a given communication network. This is especially beneficial in large utility systems with a large number of sensors. The R2 data packet may be transmitted via the communication module 306, as described above.

In response to determining that the data is not within the second range, the telemetry unit 300 determines whether the data is in additional ranges ("RA-n"), where "n" represents one or more sensed data values below an alarm value "A", and above the R2 values at process block 516. Thus, the n-range represents a range above the R2 range and below an alarm range ("RA"). While shown as a single range, it is contemplated that there may be multiple ranges between the R2 range and the alarm range RA. The RA-n ranges may include a range of values above the R2 values, but still within a non-alarm generating range. For example, where the sensed data is a methane concentration level, there may be an alarm level, such as a 10% concentration. However, values below 10%, while still within a nominal range, may be indicative of a potential issue based on the value. For example, the RA-n range may be approximately 40-70% of the alarm value. However, values of more than 70% or less than 40% are also contemplated as required for a given application. Furthermore, as noted above, there may be multiple ranges within the RA-n range. For example, in the above example, there may be an RA-$n_1$ range having values from 40-60% of the alarm value, an RA-$n_2$ range having values from 60%-80% of the alarm value, and an RA-$n_3$ range having values from 80%-99% of the alarm value. Thus, it is contemplated that there may be multiple data ranges having values less than an alarm value, as will be required for a given application.

In response to determining that the received sensor data does fall within the RA-n range, the received data is packaged into an RA-n data packet at process block 518. The RA-n data packet may include sensed data values over an n-period of time, such as one sensed value for every 6 hours. However, periods of time of more than 6 hours or less than 6 hours are also contemplated as required for a given application. In one embodiment, the n-period of time is less than the second period of time. Furthermore, where there are multiple Rn data packets associated with different n-ranges, each Rn data packet associated with an n-range may have a different period of time. For example, an RA-$n_1$ data packet may include sensed data over a 6-hour period of time, an RA-$n_2$ data packet may include sensed data over a 1-hour period of time, and an RA-$n_3$ data packet may include sensed data over a 30-minute period of time. The above examples are illustrative only, and it is contemplated that RA-n packet may include data over various periods of time as required for a given application. Generally, it is assumed that the closer the sensed data is to the alarm value, the shorter the period of time over which the sensed data is packaged is within the RA-n data packet.

As the RA-n ranges are still associated with sensed data values below an alarm level, there is no need to send real-time or near real time data to the central utility controller 108. However, as the sensed data values have increased closer to the alarm value, there is a benefit to providing more data to the central utility controller 108 at a more frequent interval.

In some embodiments, the data for the previous time period may also be included in the R2 data packet for error checking and data redundancy. For example, in the event that the central utility controller 108 did not received the data packet including data for the previous time period, the RA-n data packet will include that data as well to increase the likelihood that the data will be received by the central utility controller 108. The RA-n data packet may further include additional information, such as the number of data reads (e.g., different sensed data values) within the message, the transmission interval, etc.

Once the received sensor data is packaged, the RA-n data packet is transmitted at an RA-n interval at process block 520. In one embodiment, the RA-n interval is 6 hours. However, values of more than 6 hours or less than 6 hours are also contemplated as required for a given application. Furthermore, where there are multiple Rn ranges there may be multiple RA-n intervals. For example, an RA-$n_1$ range may have a transmission interval of 6 hours, an RA-$n_2$ range may have a one-hour interval, and an RA-$n_3$ range may include a 30-minute interval. The above examples are illustrative only, and it is contemplated that an RA-n interval may be an interval required for a given application. Generally, it is assumed that the closer the sensed data is to the alarm value, the shorter the transmission interval. The RA-n data packet may be transmitted via the communication module 306, as described above.

In response to determining that the data is not within the RA-n range, the telemetry unit 300 determines that the received data values are within an alarm range RA at process block 522. The RA range include all values equal to or greater than a predetermined alarm value. For example, where the sensed data is a methane concentration level, there may be an alarm level, such as a 10% concentration. Thus, any received value at or above the 10% threshold is within the RA range. The above 10% threshold is exemplary only, and it is understood that various applications, utility components, etc., may have various alarm threshold values. In some embodiments, the telemetry unit 300 may determine that the data is within the RA range based on an alarm message being received from a sensor device 200. An interrupt may be used by the telemetry unit 300 to automatically determine that the data is within the RA range based on receiving the alarm message.

In response to determining that the received data is within the RA range, the telemetry unit 300 then generates an RA data package at process block 524. The alarm package may include sensed values over an alarm period of time, such as one sensed value every one minute. In one embodiment, the alarm period of time may be equal to the transmission interval of the associated sensor device 200. Thus, where the sensor device 200 has a transmission interval of one minute, the alarm period of time may be equal to one minute. However, alarm periods of time of more than one minute or less than one minute are also contemplated. In one embodiment, the RA data package may further include an alarm bit. The alarm bit may trigger an alarm notification or other function in response to being received at the central utility controller 108. In some embodiments, the data for the preceding data transmission generated by telemetry unit 300 may also be included in the RA data packet for error checking and data redundancy. For example, in the event that the central utility controller 108 did not receive the data package including data for a previous transmission, the RA data package will include that data as well to increase the likelihood that the data will be received by the central utility controller 108. Once the received sensor data is packaged, the RA data package is transmitted at an RA interval at process block 526. In one embodiment, the RA interval is one minute. In other embodiments, the RA interval may be a continuous or near-continuous interval. For example, the RA interval may be every 2 seconds, or at the fastest possible rate that can be supported by the telemetry unit 300 and/or the sensing device 200. However, values of more than one minute or less than one minute are also contemplated as required for a given application. In some embodiments, the RA interval may be equal to the transmission rate of the associated sensor device 200. The RA interval provides near real time (or real time) data to the central utility controller 108 during an alarm condition to provide accurate, up-to-date information to the central utility controller 108 where an alarm occurs. In response to determining that the received data is not within the RA range, the process ends at process block 528.

The process 500 allows for data to be provided to the central utility controller dynamically, prior to an alarm condition being reached. This allows for reduced traffic within the communication network, while still providing relevant data to the central utility controller 108. By providing the data dynamically based on the sensed data values, the central utility controller 108 can perform various operations, such as trending or other types of analysis to the data to potentially address an issue before an adverse condition occurs. For example, where the sensed data is a methane concentration, by receiving data more frequently as the concentration increases, the central utility controller 108 may be able to generate a trend or prediction that the level is increasing at a rate that warrants attention. A work order may be generated to perform maintenance or other corrective actions prior to the alarm condition being reached (e.g., the concentration threshold exceeding a predetermined value). By providing more data at shorter intervals as a sensed value moves closer to an alarm value, critical information is provided to the central utility controller 108 earlier than where the data transmission rate by the telemetry unit 300 is only increased where an alarm condition occurs.

Figure 6:
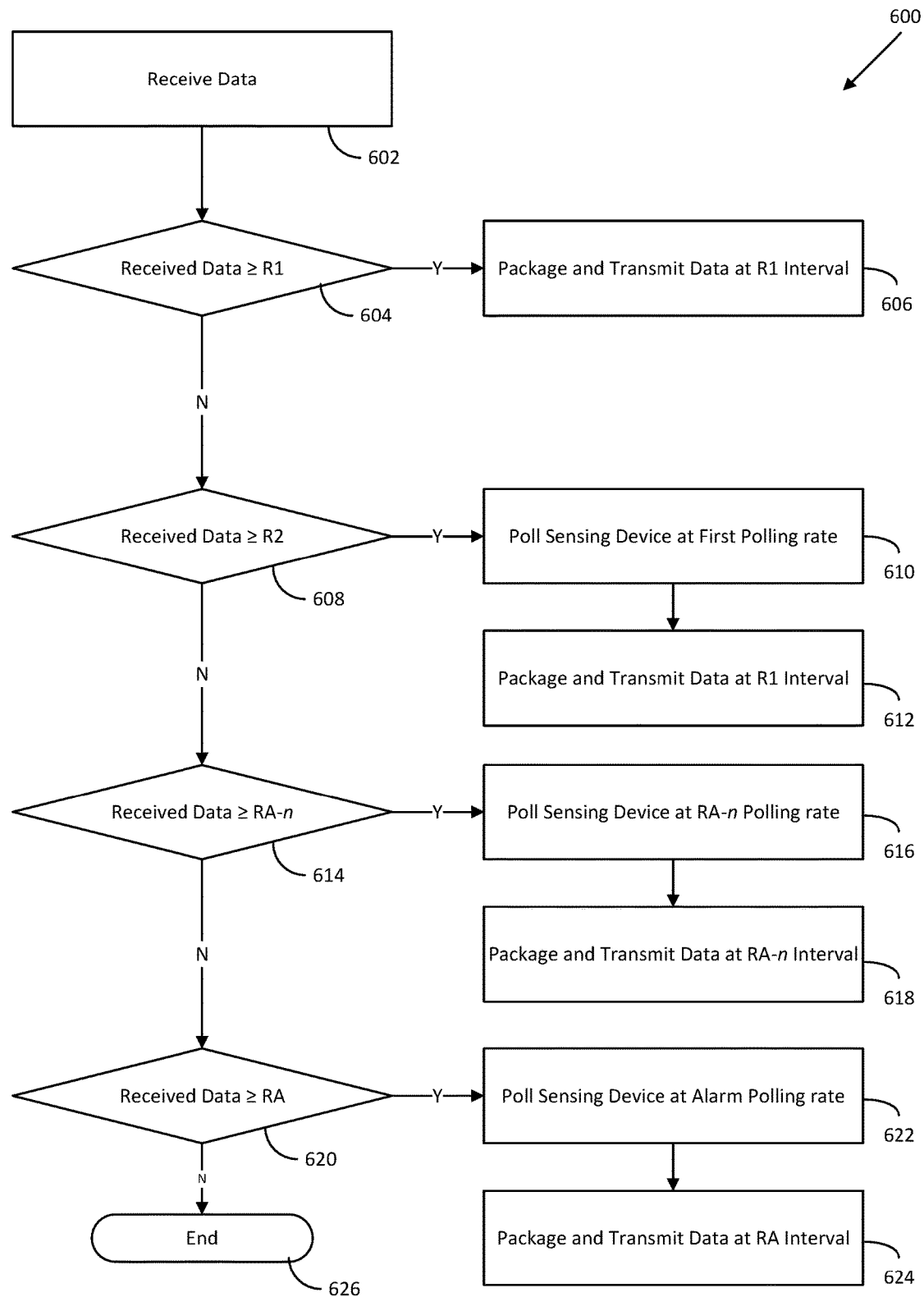
FIG. 6 is a flowchart illustrating an alternative process for processing data at the telemetry unit of FIG. 3 according to some embodiments.

Turning now to FIG. 6, an alternative process 600 for processing data at a telemetry unit, such as telemetry unit 300 is described according to some embodiments. While described with respect to telemetry unit 300, it is understood that the process 600 may be executed by the telemetry unit 106 described above, which may be used interchangeably. In one example, the processor 308 is configured to perform the process 600 by executing an application, such as the data processing application 312. The process 600 may be used where the sensor devices, such as sensor device 200 only outputs data at long intervals without being queried and/or polled to request updated data. For example, the sensor device 200 may only transmit data at intervals such as every two hours, one hour, 30 minutes, etc. Thus, where the data received by the telemetry unit begins to exceed minimum/nominal thresholds, the telemetry unit 300 may request data to be provided at a higher (e.g., faster) rate to provide more updated data to the central utility controller 108.

At process block 602, the telemetry unit 300 receives sensor data from one or more devices, such as sensor devices 200, at a first data interval. The first data interval may be the standard interval of data transmission of the sensor device 200. For example, the first data interval may be one hour. However, first data interval values of more than one hour or less than one hour are also contemplated. In some embodiments, the sensor data may be received via the communication module 306. However, in other examples, the sensor data may also be received via the I/O module 304. At process block 604, the telemetry unit 300 determines whether the received sensor data falls within a first range ("R1"). The first range may include a range of values considered normal or nominal for a sensed parameter of a given utility system component.

In response to determining that the received sensor data does fall within the first range, the received data is packaged in an R1 data packet and transmitted at process block 606. The R1 data packet may only include sensed data values over a first period of time, such as one sensed value for every 24 hours. However, periods of time of more than 24 hours or less than 24 hours are also contemplated as required for a given application. In other embodiments, the R1 data packet may include multiple data points over the first period of time, such as one data point every hour (i.e., equal to the first data interval time value). In some embodiments, the data for the previous 24 hours may also be included in the R1 data packet for error checking and data redundancy. For example, in the event that the central utility controller 108 did not receive the data packet including data for the previous 24 hours, the R1 data packet will include that data as well to increase the likelihood that the data will be received by the central utility controller 108. Once the received sensor data is packaged, the R1 data packet is transmitted at an R1 interval. In one embodiment, the R1 interval is 24 hours. However, values of more than 24 hours or less than 24 hours are also contemplated as required for a given application.

In response to determining that the data is not within the first range, the telemetry unit 300 determines whether the data is in a second range ("R2") at process block 608. The second range may include a range of values slightly above the normal or nominal values, but still within a non-alarm generating range. For example, where the sensed data is a methane concentration level, there may be an alarm level, such as a 10% concentration. However, values below 10%, while still within a nominal range, may be indicative of a potential issue based on the value. For example, the second range may be approximately 20-40% of the alarm value. However, values of more than 40% or less than 20% are also contemplated as required for a given application.

In response to determining that the received sensor data does fall within the second range, the telemetry unit 300 polls the sensor device 200 to receive data at a second data interval at process block 610. Generally, the second data interval is shorter than the first data interval. The second data interval may be the interval at which the telemetry unit 300 polls the sensor device 200. For example, the second data interval may be equal to 30 minutes. However, second data interval values of more than 30 minutes or less than 30 minutes are also contemplated. Polling the sensor device 200 includes sending a polling command, such as via the communication module 306, which is then received by the sensor device 200 via the communication module 206. The polling command may include a request for data at the time the polling command is received by the sensor device 200. In response to receiving the polling command, the sensor device 200 transmits the currently sensed data to the telemetry unit 300 in response to receiving the command. This can allow for the telemetry unit 300 to receive data more frequently in the event that the data exceeds the first range.

The received data is then packaged into an R2 data packet and transmitted at process block 612. The R2 data packet may include sensed data values over a second period of time, such as one sensed value for every 12 hours. However, periods of time of more than 12 hours or less than 12 hours are also contemplated as required for a given application. In one embodiment, the second period of time is less than the first period of time. As the second range is still associated with sensed data values below an alarm level, there is no need to send real-time or near real time data to the central utility controller 108. However, as the sensed data values have increased, there is a benefit to providing more data to the central utility controller 108 at a more frequent interval. Further, the R2 packet may include data for every 30 minutes within the 12-hour interval, as received form the sensor device 200. In some embodiments, the R2 data packet includes all data received over the past 12-hours, such as at the rate received at the second data interval, described above. Thus, multiple separate data reads may be provided to the central utility controller 108 within the R2 packet. The above R2 packet data is for exemplary purposes only, and it is understood that more or less data may be provided within the R2 packet as required for a given application. However, generally the amount of data included in the R2 packet is greater than the amount of data in the R1 packet.

In some embodiments, the data for the previous 12-hour period may also be included in the R2 data packet for error checking and data redundancy. For example, in the event that the central utility controller 108 did not received the data packet including data for the previous 12 hours, the R2 data packet will include that data as well to increase the likelihood that the data will be received by the central utility controller 108. Once the received sensor data is packaged, the R2 data packet is transmitted at an R2 interval. In one embodiment, the R2 interval is 12 hours. However, values of more than 12 hours or less than 12 hours are also contemplated as required for a given application. The R2 interval is configured to reduce energy usage of the telemetry unit 300, as well as to reduce traffic and data on a given communication network. This is especially beneficial in large utility systems with a large number of sensors. The R2 data packet may be transmitted via the communication module 306, as described above.

In response to determining that the data is not within the second range, the telemetry unit 300 determines whether the data is in additional ranges ("RA-n"), where "n" represents one or more sensed data values below an alarm value "A", and above the R2 values at process block 614. Thus, the n-range represents a range above the R2 range and below an alarm range ("RA"). While shown as a single range, it is contemplated that there may be multiple ranges between the R2 range and an alarm range RA. The RA-n ranges may include a range of values above the R2 values, but still within a non-alarm generating range. For example, where the sensed data is a methane concentration level, there may be an alarm level, such as a 10% concentration. However, values below 10%, while still within a nominal range, may be indicative of a potential issue based on the value. For example, the RA-n range may be approximately 40-70% of the alarm value. However, values of more than 70% or less than 40% are also contemplated as required for a given application. Furthermore, as noted above, there may be multiple ranges within the RA-n range. For example, in the above example, there may be an RA-$n_1$ range having values from 40-60% of the alarm value, an RA-$n_2$ range having values from 60%-80% of the alarm value, and an RA-$n_3$ range having values from 80%-99% of the alarm value. Thus, it is contemplated that there may be multiple data ranges having values less than an alarm value, as will be required for a given application.

In response to determining that the received sensor data does fall within the RA-n range, the telemetry unit 300 polls the sensor device 200 to receive data at an RA-n data interval at process block 616. Thus, the telemetry unit 300 polls the sensor device 200 at a polling rate substantially equal to the RA-n data interval. Generally, the n data interval is shorter than the second data interval. For example, the RA-n data interval may be equal to 15 minutes. However, RA-n data interval values of more than 15 minutes or less than 15 minutes are also contemplated. Further, it is understood that as there may be multiple RA-n ranges, there may be an RA-n data interval associated with each RA-n range. It is understood that generally the RA-n data intervals are shorter for each RA-n range value as the RA-n range is closer to an alarm value. Polling the sensor device 200 includes sending a polling command, such as via the communication module 306, as described above. In response to receiving the polling command, the sensor device 200 transmits the currently sensed data to the telemetry unit 300 in response to receiving the command. This can allow for the telemetry unit 300 to receive data more frequently based on the data received by the telemetry unit 300 being within the one or more RA-n ranges.

The received data is packaged into an RA-n data packet and transmitted at process block 618. The RA-n data packet may include sensed data values over an n-period of time, such as one sensed value for every 6 hours. However, periods of time of more than 6 hours or less than 6 hours are also contemplated as required for a given application. In one embodiment, the n-period of time is less than the second period of time. Furthermore, where there are multiple Rn data packets associated with different n-ranges, each Rn data packet associated with an n-range may have a different period of time. For example, an RA-$n_1$ data packet may include sensed data over a 6-hour period of time, an RA-$n_2$ data packet may include sensed data over a 1-hour period of time, and an RA-$n_3$ data packet may include sensed data over a 30-minute period of time. The above examples are illustrative only, and it is contemplated that RA-n packet may include data over various periods of time as required for a given application. Generally, it is assumed that the closer the sensed data is to the alarm value, the shorter the period of time over which the sensed data is packaged is within the RA-n data packet.

As the RA-n ranges are still associated with sensed data values below an alarm level, there is no need to send real-time or near real time data to the central utility controller 108. However, as the sensed data values have increased closer to the alarm value, there is a benefit to providing more data to the central utility controller 108 at a more frequent interval.

In some embodiments, the data for the previous time period may also be included in the R2 data packet for error checking and data redundancy. For example, in the event that the central utility controller 108 did not received the data packet including data for the previous time period, the RA-n data packet will include that data as well to increase the likelihood that the data will be received by the central utility controller 108. Once the received sensor data is packaged, the RA-n data packet is transmitted at an RA-n interval. In one embodiment, the RA-n interval is 6 hours. However, values of more than 6 hours or less than 6 hours are also contemplated as required for a given application. Furthermore, where there are multiple Rn ranges there may be multiple RA-n intervals. For example, an RA-$n_1$ range may have a transmission interval of 6 hours, an RA-$n_2$ range may have a one-hour interval, and an RA-$n_3$ range may include a 30-minute interval. The above examples are illustrative only, and it is contemplated that an RA-n interval may be an interval required for a given application. Generally, it is assumed that the closer the sensed data is to the alarm value, the shorter the transmission interval. The RA-n data packet may be transmitted via the communication module 306, as described above.

In response to determining that the data is not within the RA-n range, the telemetry unit 300 determines that the received data values are within an alarm range RA at process block 620. The RA range include all values equal to or greater than a predetermined alarm value. For example, where the sensed data is a methane concentration level, there may be an alarm level, such as a 10% concentration. Thus, any received value at or above the 10% threshold is within the RA range. The above 10% threshold is exemplary only, and it is understood that various applications, utility components, etc., may have various alarm threshold values. In some embodiments, the telemetry unit 300 may determine that the data is within the RA range based on an alarm message being received from a sensor device 200. An interrupt may be used by the telemetry unit 300 to automatically determine that the data is within the RA range based on receiving the alarm message.

In response to determining that the received data is within the RA range, the telemetry unit 300 polls the sensor device 200 to receive data at an alarm data interval at process block 622. In one embodiment, the alarm data interval may be a real time or near real time interval. For example, the alarm data interval may be one minute. However, values of more than one minute or less than one minute are also contemplated. Polling the sensor device 200 includes sending a polling command, such as via the communication module 306, as described above. In response to receiving the polling command, the sensor device 200 transmits the currently sensed data to the telemetry unit 300 in response to receiving the command. This can allow for the telemetry unit 300 to receive real time or near real time data in response to determining that the received data is within the RA range.

The telemetry unit 300 then generates an alarm package and transmits the alarm package at process block 624. The alarm package may include sensed values over an alarm period of time, such as one sensed value every one minute. However, values or more than one minute or less than one minute are also contemplated. In one embodiment, the alarm data interval may be equal to the polling alarm data interval. Thus, where the sensor device 200 is polled by the telemetry unit 300 every minute (e.g., the alarm data interval), the alarm period of time may be equal to one minute. However, alarm periods of time of more than one minute or less than one minute are also contemplated. In one embodiment, the RA package may further include an alarm bit. The alarm bit may trigger an alarm notification or other function upon being received at the central utility controller 108. In some embodiments, the data for the preceding data transmission generated by telemetry unit 300 may also be included in the RA data packet for error checking and data redundancy. For example, in the event that the central utility controller 108 did not receive the data packet including data for packet transmission, the RA data packet will include that data as well to increase the likelihood that the data will be received by the central utility controller 108. Once the received sensor data is packaged, the RA data packet is transmitted at an RA interval at process block 526. In one embodiment, the RA interval is one minute. However, values of more than one minute or less than one minute are also contemplated as required for a given application. In some embodiments, the RA interval may be equal to the transmission rate of the associated sensor device 200. The RA interval provides near real time (or real time) data to the central utility controller 108 during an alarm condition to provide accurate, up-to-date information to the central utility controller 108 in the event that an alarm occurs.

In response to the received data is not within the range RA, the process ends at process block 626.

The process 600 allows for data to be provided to the central utility controller dynamically, prior to an alarm condition being reached. This allows for reduced traffic within the communication network, while still provided relevant data to the central utility controller 108. By providing the data dynamically based on the sensed data values, the central utility controller 108 can perform various operations, such as trending or other types of analysis to the data to potentially address an issue before an adverse condition occurs. For example, where the sensed data is a methane concentration, by receiving data more frequently as the concentration increases, the central utility controller 108 may be able to generate a trend or prediction that the level is increasing at a rate that warrants attention. A work order may be generated to perform maintenance or other corrective actions prior to the alarm condition being reached (e.g., the concentration threshold exceeding a predetermined value). By providing more data at shorter intervals as a sensed value moves closer to an alarm value, critical information is provided to the central utility controller 108 earlier than where the data transmission rate by the telemetry unit 300 is only increased in the event that an alarm condition occurs.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A telemetry device associated with a utility system, comprising:
   a communication module; and
   one or more electronic processors in communication with the communication module, the one or more electronic processors are configured to:
   receive data from one or more sensor devices, wherein the one or more sensor devices are configured to sense one or more parameters of a component of the utility system,
   determine a range associated with a value of the received data,
   in response to determining that the value of the received data is in a first range,
   generate a first data package having a first number of received data values and transmit the first data package at a first transmission interval, and
   in response to determining that the value of the received data is in a second range,
   generate a second data package having a second number of the received data values and transmit the second data package at a second transmission interval,
   wherein the second number of the received data values is larger than the first number of the received data values; and
   wherein the second transmission interval is a shorter interval than the first transmission interval.

2. The telemetry device of claim 1, wherein the first range is a nominal value range, and the second range is an intermediate value range, the intermediate value range being between the nominal value range and an alarm range.

3. The telemetry device of claim 1, wherein the one or more electronic processors are further configured to:
in response to determining that the value of the received data is in an alarm range, generate a third data package having a third number of the received data values; and
transmit the third data package at an alarm transmission interval, wherein the alarm transmission interval is a continuous interval or near the continuous interval;
wherein the third data package includes real-time of the received data or near the real-time of the received data from the one or more sensor devices.

4. The telemetry device of claim 3, wherein the third data package further includes an alarm bit.

5. The telemetry device of claim 1, wherein the first data package and the second data package include a quantity of the received data values contained in at least one of the first data package and the second data package, and the first transmission interval associated with the first data package and the second transmission interval associated with the second data package.

6. The telemetry device of claim 1, wherein the first data package and the second data package are transmitted to a central utility controller.

7. The telemetry device of claim 1, wherein the first transmission interval is 12 hours and the second transmission interval is 6 hours.

8. A method for processing data by a telemetry device having one or more electronic processors for executing the method, comprising:
receiving the data from one or more sensor devices configured to sense one or more parameters of a component of a utility system;
determining a range associated with a value of the received data;
generating a data package based on the determined range;
transmitting the data package at an interval based on the determined range;
generating a first data package having a first number of received data values in response to the determined range being a nominal range and transmitting the first data package at a first transmission interval;
generating a second data package having a second number of the received data values in response to the determined range being an intermediate range and transmitting the second data package at a second intermission interval,
wherein the second number of the received data values is greater than the first number of the received data values; and
wherein the second transmission interval is shorter than the first transmission interval.

9. The method of claim 8, further comprising:
generating an alarm data package having a third number of the received data values in response to the determined range being an alarm range, wherein the third number of the received data values is greater than the second number of the received data values; and
transmitting the alarm data package at a third transmission interval, wherein the third transmission interval is shorter than the second transmission interval.

10. The method of claim 9 wherein the alarm data package includes an alarm bit.

11. The method of claim 10, wherein the third transmission interval is a continuous interval or near the continuous interval.

12. The method of claim 8, wherein the first data package and the second data package include a quantity of the received data values contained in at least one of the first data package and the second data package, and the first transmission interval associated with the first data package and the second transmission interval associated with the second data package.

13. A telemetry device associated with a utility system, comprising:
a communication module,
one or more electronic processors in communication with the communication module, the one or more electronic processors are configured to:
receive data from one or more sensor devices, wherein the one or more sensor devices are configured to sense one or more parameters of a component of the utility system,
determine a range associated with a value of the received data, in response to determining that the value of the received data is in a first range,
generate a first data package having a first number of received data values and transmit the first data package at a first transmission interval, and
in response to determining that the value of the received data is in a second range:
transmit a polling command to the one or more sensor devices at a first polling interval,
receive a first updated data from the one or more sensor devices in response to the transmitted polling command at the first polling interval, generate a second data package having a second number of the received data values, and
transmit the second data package at a second transmission interval, wherein the second number of the received data values is larger than the first number of the received data values; and
wherein the second transmission interval is a shorter interval than the first transmission interval.

14. The telemetry device of claim 13, wherein the first range is a nominal value range, and the second range is an intermediate value range, the intermediate value range being between the nominal value range and an alarm range.

15. The telemetry device of claim 13, wherein the one or more electronic processors are further configured to:
in response to determining that the value of the received data is in an alarm range:
transmit the polling command at a second polling interval shorter than the first polling interval;
receive a second updated data from the one or more sensor devices in response to the transmitted polling command at the second polling interval;
generate a third data package having a third number of the received data values; and
transmit the third data package at an alarm transmission interval, wherein the alarm transmission interval is a continuous interval or near the continuous interval.

16. The telemetry device of claim 15, wherein the third data package further includes an alarm bit.

17. The telemetry device of claim 13, wherein the first data package and the second data package include a quantity of the received data values contained in at least one of the first data package and the second data package, and the first transmission interval associated with the first data package and the second transmission interval associated with the second data package.

18. The telemetry device of claim 13, wherein the first data package and the second data package are transmitted to a central utility controller.

\* \* \* \* \*